US006477845B1

(12) United States Patent
Larsson

(10) Patent No.: US 6,477,845 B1
(45) Date of Patent: Nov. 12, 2002

(54) APPARATUS FOR AIR TREATMENT AND TRANSPORTATION OF A MATERIAL

(76) Inventor: Ruben Larsson, Tullaregaten 18, SE-252 67 Helsingborg (SE)

( * ) Notice: Subject to any disclaimer, the term of this patent is extended or adjusted under 35 U.S.C. 154(b) by 0 days.

(21) Appl. No.: 09/890,449

(22) PCT Filed: Jan. 20, 2000

(86) PCT No.: PCT/SE00/00109

§ 371 (c)(1),
(2), (4) Date: Aug. 1, 2001

(87) PCT Pub. No.: WO00/45949

PCT Pub. Date: Aug. 10, 2000

(30) Foreign Application Priority Data

Feb. 3, 1999 (SE) .............................................. 9900381

(51) Int. Cl.[7] .............................................. F25D 17/00
(52) U.S. Cl. .................................. 62/57; 62/63; 62/378
(58) Field of Search ............................. 62/57, 380, 63

(56) References Cited

U.S. PATENT DOCUMENTS

| 3,691,644 A | * 9/1972 | Schnitzer ........................ 62/57 |
| 3,817,370 A | 6/1974 | Cox ............................ 198/220 |
| 3,865,965 A | 2/1975 | Davis et al. ................ 426/519 |
| 3,914,953 A | * 10/1975 | Miller .......................... 62/380 |
| 4,062,202 A | * 12/1977 | Cloudy ......................... 62/380 |
| 4,177,647 A | * 12/1979 | Overbye ....................... 62/380 |
| 4,186,566 A | * 2/1980 | AuYoung ..................... 62/380 |
| 4,283,923 A | * 8/1981 | Gruda et al. .................... 62/57 |
| 4,418,816 A | 12/1983 | Kropp |
| 4,628,838 A | 12/1986 | Love ........................... 110/347 |
| 4,951,472 A | * 8/1990 | Hansen et al. ................. 62/57 |
| 5,447,040 A | 9/1995 | Rothstein ..................... 62/303 |
| 5,850,906 A | 12/1998 | Dean |

FOREIGN PATENT DOCUMENTS

| EP | 0 224 289 | 6/1987 | ............ A23B/7/04 |
| GB | 1303972 | 1/1973 | |

\* cited by examiner

*Primary Examiner*—Ronald Capossela
(74) *Attorney, Agent, or Firm*—Michael D. Bednarek; Shaw Pittman LLP

(57) ABSTRACT

Apparatus for continuous treatment and transportation of a material (7), consisting of piece goods or granules of solid material, in an at least partly fluidized bed, which apparatus comprises a perforated trough bottom (5) for the material and means (3) for creating an upwardly directed air or gas flow through said trough bottom (5) and said material (7). The trough bottom (5) is disposed to move, from a starting position, in the conveying direction of the material (7) and opposite to the conveying direction of the material, the trough bottom in motion opposite to the conveying direction being disposed, relative to the material (7), to exhibit greater acceleration ($a_2$) than a maximum acceleration ($a_1$) relative to the surroundings in motion in the conveying direction.

30 Claims, 3 Drawing Sheets

APPARATUS FOR AIR TREATMENT AND TRANSPORTATION OF A MATERIAL

TECHNICAL FIELD

The present invention relates to an apparatus for the treatment and transportation of a material, consisting of piece goods or granules of solid material, in an at least partly fluidized bed, which apparatus comprises a perforated trough bottom for the material and means for creating an upwardly directed air or gas flow through said trough bottom and said material.

PRIOR ART AND PROBLEMS

In thermal air treatment of foodstuffs on an industrial scale, continuously operating air treatment apparatuses are utilized, which often operate according to the fluidized bed principle. The term thermal air treatment is here taken to mean refrigeration or freezing by means of cold air or gas, heating, drying or moistening by means of hot air, gas or steam etc. The product which is to be air-treated is in this connection conveyed in a continuous process chain and enters the fluidized bed in a first position in order then to be conveyed in the fluidized bed to a second position. When the product reaches the second position, it is ready-treated and leaves the fluidized bed. The treatment air is caused in the apparatus to flow from underneath and upwards through a perforated trough bottom and through the material located above this trough bottom, fluidizing of the material being achieved. The heat transfer is very good in the fluidized state, for which reason quick and efficient treatment (freezing/heating) is obtained.

In a truly fluidized state transportation of the product from the first position to the second position takes place automatically, in that the material is poured in at the first position and permitted to flow over a side wall/edge (overflow) at the second position. There between the material behaves like a fluid liquid thanks to fluidization. Often, however, a truly fluidized bed cannot be achieved, e.g. when the material which is to be treated consists of delicate, heavy and/or irregular products. The reason for this is that the air flow through the bed cannot always be controlled so that the requirements for refrigeration/heat treatment, damage to the product and transportation requirements are met. The bed then remains only partly fluidized, semi-fluidized, in which case the product will rest wholly or partly on the perforated trough bottom.

A number of apparatuses are known, the aims of which inter alia are to improve transportation in conjunction with the above problems. In a known type of apparatus, the perforated plate including its side walls/edges, i.e. the trough, or only the perforated trough bottom, is agitated by symmetrical movements backwards and forwards in the conveying direction of the material. This aims to provide better spreading and separation of the material, transportation being made easier due to the fluidizing effect. In another similar type of apparatus, the trough is agitated instead in a vertical direction to achieve the same effect.

A further way of solving the problem has been to provide the apparatus with an endless net conveyor belt, the part of the conveyor belt which runs in the conveying direction being arranged above the perforated trough bottom, while the return part is arranged under the same. Alternatively, the conveyor belt can be formed (normally of plastic) so that it forms both the conveyor belt and the perforated trough bottom.

In some simple apparatuses, the perforated trough bottom is not used, but only a net conveyor belt.

A known apparatus of the type stated above is shown in U.S. Pat. No. 4,283,923, which apparatus comprises both a plate as a basis for a fluidized bed and a net conveyor belt arranged above the plate, which net conveyor belt is disposed to be agitated symmetrically backwards and forwards in the conveying direction.

In U.S. Pat. No. 4,628,838 an apparatus set is shown for combustion of a material in a fluidized bed, a filter plate which forms an air-permeated base for the fluidizing bed being disposed to vibrate so that a turbulently fluidizing motion occurs, transportation of the combustion material from the inlet end to the outlet end being facilitated.

U.S. Pat. No. 4,821,654 shows a furnace with a fluidized bed, which is stated to be used for thermomechanical regeneration of foundry sand. The fluidizing effect is stated to be amplified by vibration of the bed bottom, the vibrations also being said to facilitate transportation of the sand from the inlet end to the outlet end.

A further apparatus for freezing food in a fluidized bed is shown in U.S. Pat. No. 5,447,040, a conveyor belt being disposed to be driven at least periodically in the opposite direction to the conveying direction of the food. The aim of this is stated to be to counteract the formation of ice in clumps.

The above-named methods and apparatuses certainly function well in principle for their purposes, but the apparatuses are expensive to manufacture, require maintenance and are difficult to clean. The cleaning aspect is very important, especially in the food industry.

BRIEF ACCOUNT OF THE INVENTION

The object of the present invention is to present an apparatus for, preferably continuous, treatment and transportation of a material, consisting of piece goods or granules of solid material, in an at least partly fluidized bed, the aforementioned problems being lessened or overcome.

Thus an apparatus is presented according to claim 1 in which agitation of a trough bottom backwards and forwards in the conveying direction is utilized to actively convey a material which is at least partly carried by the trough bottom. In a partly fluidized bed in particular, i.e. where fluidizing on the basis of an upwardly directed air flow is not sufficient for the material to flow along like a fluid, agitation/movement on the part of the trough bottom acts to move the material actively in the conveying direction.

The apparatus according to the invention is relatively cheap to manufacture and maintain, as no conveyor belt or belt-driving mechanism is required. Cleaning becomes distinctly easier, since the nooks which are difficult to reach can be avoided, for example on belt tracks under the belt which are otherwise never reached without dismantling the equipment. As the difference in hygiene compared with apparatuses with conveyor belts is considerable, the apparatus according to the invention has qualifications to be approved for new applications.

The conveying principle of the apparatus according to the invention is based on the fact that the trough bottom is caused to move in the conveying direction with an acceleration which is not sufficient to overcome the static friction force between the material conveyed and the trough bottom. The trough bottom will then carry the material with it in the movement in the conveying direction. When the trough bottom has reached an end position for the movement, the direction changes, it being caused to accelerate sufficiently quickly in the direction opposite to the conveying direction for the static friction force between the material conveyed and the trough bottom to be overcome. The material is then set in motion relative to the trough bottom.

It should be understood that all the accelerations mentioned relate to absolute values, the direction of the accelerations being evident from the context.

According to one aspect of the invention, the trough bottom is disposed to move as far opposite to the conveying direction as in the conveying direction, the trough bottom not exhibiting any net movement in or opposite to the conveying direction.

According to another aspect of the invention, transportation of the material on the trough bottom takes place solely due to the movement of the trough bottom opposite to and in the conveying direction, and due to the fluidizing effect. It is characteristic of the invention that no further conveying power is required, e.g. in the form of net conveyor belts with net movement in the conveying direction, a flow of carrier gas in the conveying direction or the like. However, there is naturally nothing to prevent the invention from being combined with such methods.

According to an embodiment of the invention, a second, lower trough bottom is disposed to move in relation to the upper trough bottom and is formed so that the air speed through the double trough bottom is partly limited and released in a controlled manner. By limiting the air partly, an increased air flow is obtained in the areas where the air is not restricted, with a defined total flow of air through the product bed. This contributes to increased separation of the material due to the fact that the material is caused to move in a vertical direction and that it strikes the trough bottom when it sinks downwards due to the temporary restriction in the upwardly directed air flow.

The separation principle of the apparatus according to this embodiment of the invention is based on the fact that the lower trough bottom is formed with apertures, preferably transverse slits, over the entire trough width and with homogeneous material lying in between. The apertures then function as a passage for the air and the homogeneous material as a barrier. This second trough bottom is disposed to be agitated backwards and forwards along the conveying direction at a frequency of 20–180 cycles per minute. These cycles result in that the air flow on each cycle is reduced momentarily, the treated and conveyed material being caused to land or at least move vertically downwards at the same frequency as the cycles.

DETAILED ACCOUNT OF THE INVENTION

The invention will be described below starting out from a preferred working example relating to a freezer, and with reference to the figures, of which:

Figure 1:
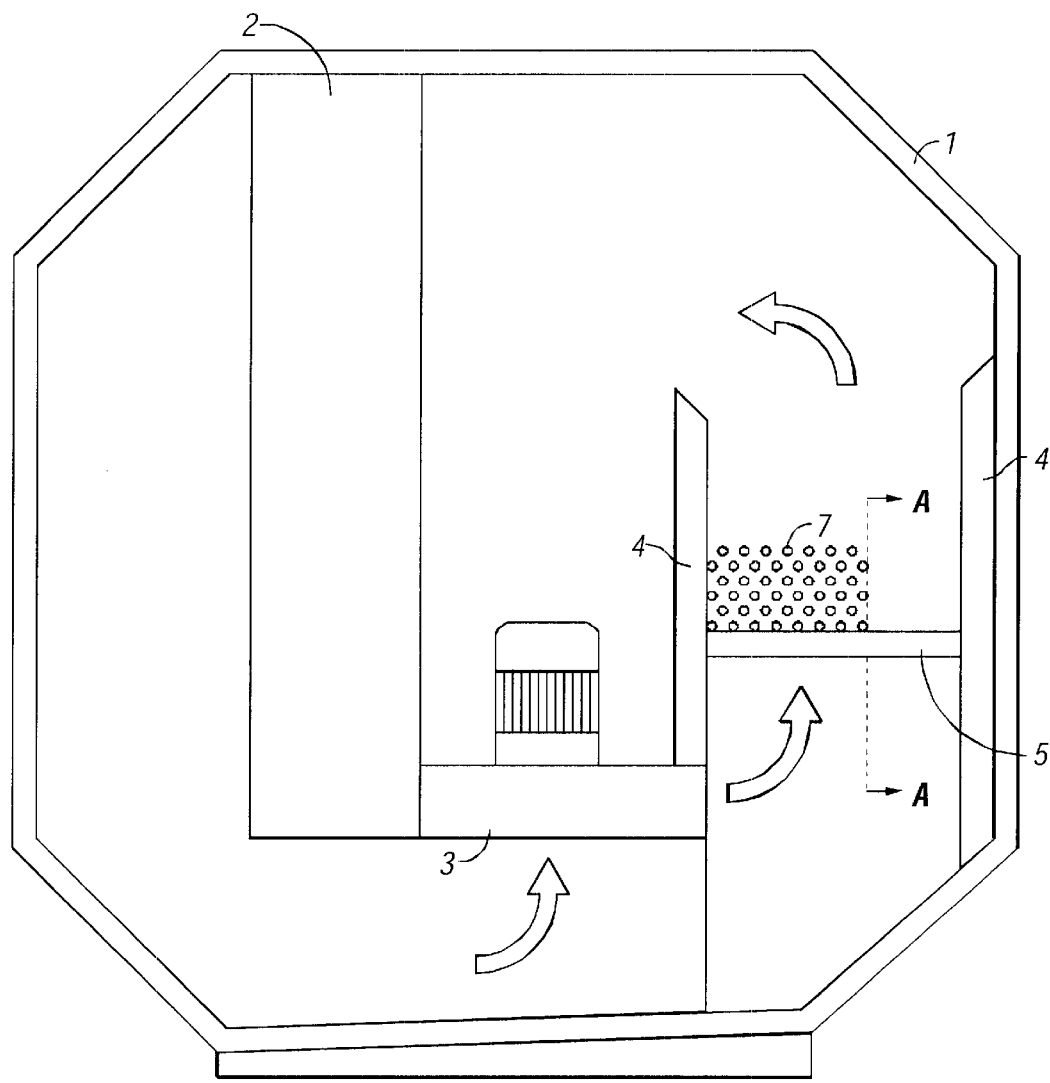
FIG. 1 shows in cross-section equipment for continuous freezing of food in an at least partly fluidized bed, according to a preferred embodiment of the invention.

In the equipment shown in FIG. 1, an insulated housing is designated 1. The material 7, which is to pass through the equipment, i.e. in the example shown food which is to be frozen, passes as a bed through the equipment in a direction which is perpendicular to the plane of the paper in the figure, on top of the perforated trough bottom 5. A flow of air for at least partial fluidization of the material bed is generated by one or more fans 3. The air flow passes through the trough bottom 5, through the material 7 and further through one or more cooling batteries 2. In the cooling batteries, the temperature of the air is lowered, following which the air is once more caused to pass through the fan and further through the trough bottom and material.

Figure 2A:
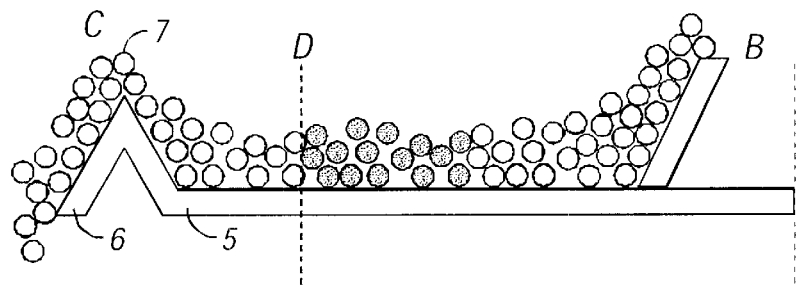
FIG. 2A shows in cross-section A—A in the conveying direction the trough bottom in the equipment according to FIG. 1, the trough bottom being located in a starting position for its movement.
Figure 2B:
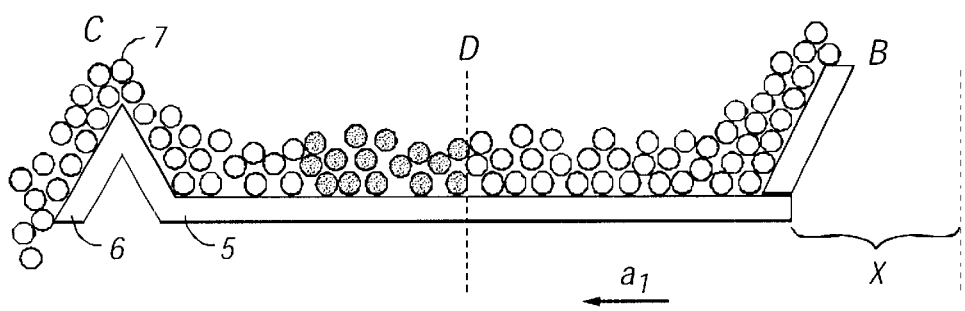
FIG. 2B shows the same trough bottom as in FIG. 2A, but in an end position for its movement.
Figure 2C:
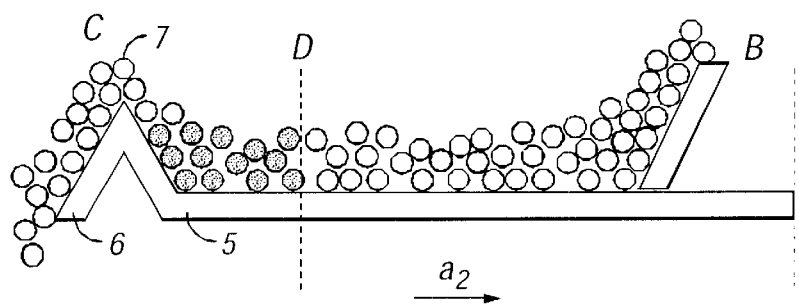
FIG. 2C shows the same trough bottom as in FIGS. 2A and B, now back in the starting position for its movement.

The material 7, i.e. the food which is to be frozen, e.g. peas, maize, cauliflower, chips, broccoli etc. is brought into the equipment in a first position B, FIGS. 2A–C. The material is conveyed over the trough bottom 5 to a second position C, where the material leaves the trough bottom over a side wall/edge 6. As the material bed 7 is permeated from underneath by the air flow, an at least semi-fluidized bed is formed. Thanks to the fluidizing effect, the material is conveyed partly automatically from position B to position C, as new material is poured in at B and treated material is emptied out at C. Since the fluidization, according to the problem described earlier, is not ideal, assistance is however required with transportation, which assistance is obtained by means of the present invention. The conveying time, i.e. the residence time in the apparatus is usually about 5–25 minutes depending on the product.

The trough bottom 5 consists of a perforated plate or elongated track, preferably of a homogeneous polymer material, e.g. plastic or Teflon. The perforation consists typically of holes with the dimension 2–7 mm and a centre distance between the holes of 5–30 mm. The plate or trough bottom suitably has a thickness of about 15 mm and a length of about 3–15 meters. The area of the trough bottom can typically be up to about 30 m². The trough bottom 5 is disposed according to the invention to move reciprocatingly backwards and forwards in a way which is asymmetrical from the acceleration viewpoint, in the conveying direction of the material 7.

In FIG. 2A, the trough is shown with the trough bottom 5 in its starting position relative to the surroundings, the position relative to the surroundings being indicated symbolically by the imaginary line D—D. In the starting position for a cycle of the trough's movement, the material which is being treated and conveyed is in a first position relative to the trough bottom and surroundings. To elucidate how the material is conveyed during a cycle, a certain part of it has been marked as filled-in dots. In the starting position, the marked part is just to the right of the line D—D in FIG. 2A.

The trough bottom 5, or the whole trough, now moves a distance x in the conveying direction of the material, i.e. to the left in the figure, at an acceleration $a_1$ which is less than $\mu_s \times g$, $\mu_s$ being a static friction coefficient between the trough bottom and the material and g being the gravitation constant. The acceleration $a_1$, relative to the surroundings, in the conveying direction is selected such that for the entire period or principally the entire period during the acceleration phase it is less than $\mu_s \times g$, the material being carried with the trough bottom in the conveying direction. When the desired speed in the conveying direction has been attained, the movement can continue without acceleration. The acceleration between the material 7 and the trough bottom 5 is equal to zero for the entire period, or principally the entire period. When the movement has completed the distance x, which can be e.g. 0.05–0.5 meters, preferably 0.08–0.3 meters and even more preferredly 0.1–0.2 meters, the material has followed the movement and the marked part is now (FIG. 2B) just to the left of the line D—D.

Now the trough bottom turns back distance x for a return movement (FIG. 2C), an acceleration $a_2$, relative to the material, opposite to the conveying direction for the material being selected so that it exceeds $\mu_s \times g$, during at least some part of the return movement, preferably initially. Thanks to the high acceleration and the mass inertia of the material, the static friction force between the material and the trough bottom is overcome, the trough bottom being moved beneath the material. When the trough bottom and the material have begun to slide in relation to one another, the acceleration $a_2$ between the material and the trough bottom can be reduced to be greater than $\mu_d \times g$, $\mu_d$ being a dynamic friction coefficient between the trough bottom and the material. It is however preferred for the acceleration to exceed $\mu_s \times g$ for the entire period or principally the entire period during the return movement. The trough bottom is further disposed to exhibit acceleration relative to the material conveyed in the movement opposite to the conveying direction for the entire period or part of the period, preferably principally the entire period. The material is now moved to the left relative to the trough bottom, the movement of the material relative to the trough bottom however being retarded by the value $\mu_d \times g$, owing to the dynamic friction.

When the trough bottom has returned to the starting position (FIG. 2C), the material, as indicated by the marked part, has been moved in the conveying direction. If necessary the edge 6, which moves together with the trough bottom, can be dropped or lowered during movement opposite to the conveying direction, to prevent the material from "rebounding" against the edge. The edge 6 is further formed suitably so that its height is adjustable for different applications, e.g. by it consisting of a fold in the trough bottom, which fold can be set at a large angle so that it is low or at a small angle so that it is high. The opposite side wall/edge, at position B, is suitably stationary, i.e. it does not follow the movements of the trough bottom.

The movement cycle which is shown in FIGS. 2A to 2C is repeated continuously at 0.1–60 cycles per minute, preferably at 1–30 cycles per minute and even more preferredly at 1.5–20 cycles per minute, the material flowing along in a mainly continuous, even flow over the trough bottom 5 from the first position B to the second position C. The ideal net speed of the material is 0.03–4 meters per minute, preferably 0.1–3 meters per minute and even more preferredly 0.2–2 meters per minute.

In certain cases, when the desired conveying speed and the size of the apparatus leads to the required number of cycles per minute being low, it may be desirable in addition to the conveying movement cycles to agitate the trough or trough bottom symmetrically backwards and forwards in the conveying direction to achieve a good spread and separation of the material, i.e. to increase the fluidizing effect. Symmetrical agitation of this kind can be executed with the same travel x as the conveying cycles described above, but with the same acceleration and maximum speed in both forward and return movements, or at least with accelerations which, even though they differ in forward and backward movements, do not result in themselves in transportation of the material. The movement of the trough or trough bottom can here be executed at 45–180, preferably 55–150, and even more preferredly 65–130 cycles per minute, only a number (according to the above) of these cycles being formed as conveying cycles, while the rest are formed as symmetrical agitation. The required number of conveying cycles per minute can ideally be calculated as:

L/(x×t), where L is the length of the trough bottom in meters, x is the travel in meters and t is the desired residence time in minutes.

Furthermore, the means for creating an upwardly directed air or gas flow in the apparatus is suitably disposed to pulse the air or gas flow at a frequency of 60–90 pulses per minute. The pulsation leads to the air flow, on each pulse, being reduced momentarily, the treated and conveyed material being caused to land or at least move vertically downwards at the same frequency as the pulsation. According to the invention, the air or gas pulsation can be synchronized with the conveying movements of the trough bottom in and opposite to the conveying direction, so that the conveying movement in the conveying direction is executed in conjunction with the material landing on the trough bottom during a flow-reducing air or gas pulse. The movement of the trough bottom opposite to the conveying direction can then best be executed in conjunction with the material moving, or at least partly moving upwards when the air or gas flow is increased once more following a pulse.

The movement of the trough bottom backwards and forwards can be achieved in various ways, e.g. by using a cam disk, pneumatic cylinder etc., it being possible to control the accelerations and speeds by means of preprogrammed or calculated algorithms. When using e.g. electrically controlled pneumatic cylinders, speeds and accelerations can be adjusted by adjustment of the air flows.

The equipment can be programmed in this connection, for example, so that the operator only has to enter the type of product and type of operating program in a computer, with the option of changing the conveying speed.

Figure 3:
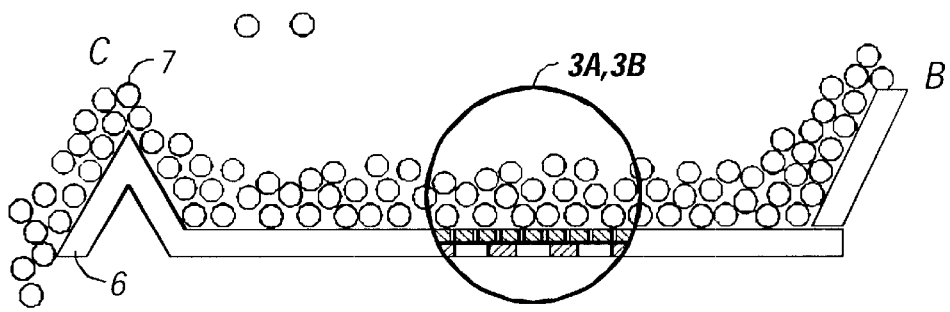
FIG. 3 shows the trough bottom according to FIGS. 2A–C, with marking of the section for FIGS. 3A–B.
Figure 3A:
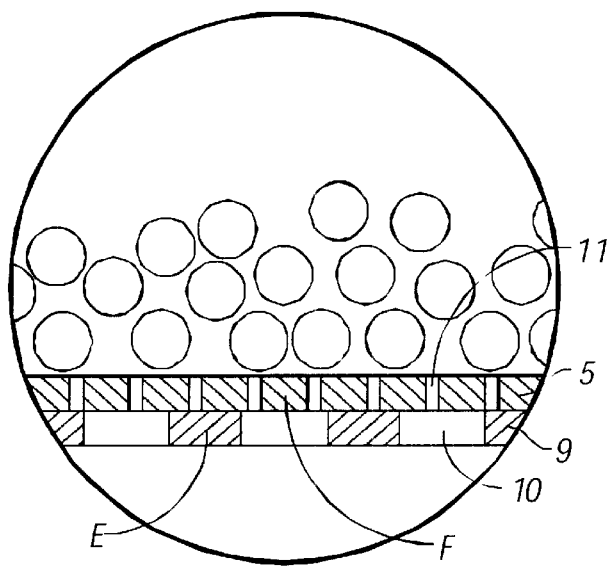
FIG. 3A shows, in cross-section, how a second trough bottom 9 in an embodiment of the invention can be arranged movably beneath the first trough bottom according to FIGS. 1–2.
Figure 3B:
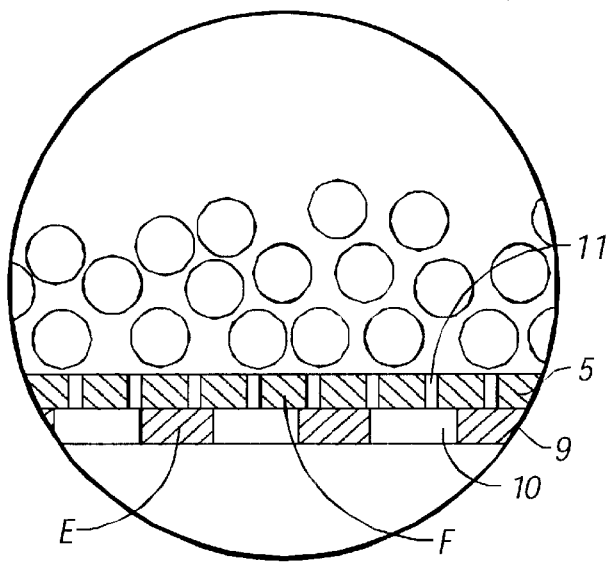
FIG. 3B shows the same trough bottom as in FIG. 3A, but in the opposite end position for its movement.

Since the existing air in the fluidization is sometimes insufficient to separate viscous and adhesive materials from one another, assistance is required with separation in certain cases, which assistance is achieved according to an embodiment of the invention by means of a combined trough bottom 5, 9, as shown in FIGS. 3, 3A, 3B.

Below the trough bottom 5 there is provided a lower trough bottom 9. This trough bottom is formed with transverse apertures 10, preferably slits of 5–20 cm in width over the entire width of the trough and with transverse homogeneous material lying in between, which is also 5–20 cm wide. The apertures function here as an air passage and the homogeneous material as an air barrier. A partial restriction of the air is hereby achieved and an increase in air speed achieved by the apertures. The magnitude of the increase in air speed depends on how the ratio between aperture and homogeneous material is selected.

This second trough bottom is disposed so that it can be agitated symmetrically backwards and forwards along the conveying direction at a frequency of 20–180 cycles per minute. These cycles mean that the air flow on each cycle is reduced momentarily in the areas of the upper trough bottom 5 with its holes 11, which are momentarily located over the homogeneous parts of the lower trough bottom 9, the treated and conveyed material being caused to land or at least move vertically downwards. FIG. 3B shows how a reference point E in the lower trough bottom 9 has been moved in relation to a reference point F in the upper trough bottom 5 when the lower trough bottom 9 is displaced to its one end position.

The backwards and forwards movement of the trough bottom can be achieved in various ways, e.g. by the use of a cam disk, pneumatic cylinder etc.

According to an aspect of the invention, the apparatus is designed so that the trough bottom can be pulled out for cleaning, preferably due to the fact that the apparatus can be opened at one or both gable ends, the trough bottom being disposed to be pulled out in a longitudinal axial direction. When the trough bottom is to be removed, the movement producing mechanism, e.g. the pneumatic cylinders, is released from the trough bottom and the trough bottom is pulled out in a longitudinal axial direction, it best running in a track or between rollers along each longitudinal side. Then the operator may enter the apparatus where the trough bottom has been, in order to clean the apparatus internally. One condition facilitating this is that according to the invention no net conveyor belt is required in the apparatus. Owing to this, the apparatus is also small compared with conventional apparatuses, in that no separate man passage is required inside the apparatus.

EXAMPLE

In an conceived arithmetic example, the static friction coefficient between the material and the trough bottom $\mu_s$=0.05, while the dynamic friction coefficient $\mu_d$=0.01. The gravitation constant g=9.82 m/s$^2$. During a cycle, the trough bottom moves distance x=0.1 meter in the conveying direction and equally far back. The trough bottom is 8 meters long and undergoes about 5 conveying cycles per minute.

With regard to the movement of the trough bottom in the conveying direction, the acceleration is selected such that it is below $\mu_s \times$g for the entire period or principally the entire period, i.e. $a_1$<0.05×9.82 m/s$^2$=0.49 m/s$^2$. When the desired speed is attained, the movement can continue without further acceleration until distance x has been reached.

The trough bottom now changes direction and an acceleration is produced initially which exceeds 0.49 m/s$^2$, for the static friction to be overcome. When the material has begun to slide in relation to the trough bottom, the acceleration between the material and the trough bottom can be reduced to exceed $\mu_d \times$g, i.e. $a_2$<0.01×9.82 m/s$^2$=0.10 m/s$^2$.

According to ideal calculations, the material is given a net speed of 0.5 m/minute, giving a resulting residence time of about 16 minutes.

The invention is not limited to the embodiments described above, but can be varied within the scope of the following claims. Thus it is realized for example that the principle of transportation in an at least partly fluidized bed can also be utilized in types of fluidized beds other than those for freezing, baking, drying and moistening of food, e.g. in fluidized beds which are combustion furnaces. It is further realized that the principle of transportation can be utilized also for completely unfluidized conveyor belts, the applicant reserving the right to apply for separate patent protection for this at a later stage.

Regarding the principle of transportation according to the invention, it is realized that said accelerations, both in and opposite to the conveying direction, can exceed or be below the limit values indicated for shorter periods. However, the principle is that the movement in the conveying direction is designed so that the material mainly follows the movement of the trough bottom, while the movement opposite to the conveying direction is designed so that the material mainly slides on the trough bottom.

It is also realized that the apparatus, in addition to the above described embodiment with a single trough bottom, can be executed with several trough bottoms which can then be individually arranged to move in or opposite to the conveying direction. It may then e.g. be the case that the apparatus comprises a first trough bottom for superficial pre-freezing of the material and a second trough bottom for ready-freezing of the material. These two trough bottoms can then preferably according to the above be pulled out at each gable end of the apparatus for cleaning of the trough bottoms and the apparatus.

What is claimed is:

1. An apparatus for treatment and transportation of a material (7), consisting of piece goods or granules of solid material, in an at least partly fluidized bed, the apparatus comprising:

a perforated trough bottom (5) for the material (7);

means for moving the trough bottom from a starting position, in a conveying direction of the material (7) and also opposite to the conveying direction of the material (7), the means for moving the trough bottom being arranged to accelerate the trough bottom (5) in the direction opposite to the conveying direction at a greater acceleration ($a_2$) relative to the material (7) than a maximum acceleration ($a_1$) in the conveying direction; and means (3) for creating an upwardly directed air or gas flow through said trough bottom (5) and said material (7).

2. The apparatus according to claim 1, wherein the trough bottom (5) is disposed to move an equally long distance in the conveying direction as opposite to the conveying direction, the trough bottom not displaying any net movement in or opposite to the conveying direction.

3. The apparatus according to claim 1, wherein the trough bottom (5) consists of at least one of a perforated plate and a perforated elongated track, wherein said track or plate is comprised of a homogeneous polymer material.

4. The apparatus of claim 1, further comprising an overflow edge (6) that moves together with the trough bottom (5).

5. The apparatus of claim 4, wherein the overflow edge is one of dropped and lowered during movement in the direction opposite to the conveying direction.

6. The apparatus according to claim 1, wherein the means for moving the trough bottom moves the trough bottom (5) so that it does not exhibit substantially any acceleration or speed relative to the material (7) conveyed during substantially an entire conveying movement period, and so that it does, in the movement direction opposite to the conveying direction, exhibit acceleration relative to the material conveyed for substantially the entire opposite conveying movement period.

7. The apparatus according to claim 1, wherein the acceleration ($a_1$) of the trough bottom (5) in the conveying direction, relative to the surroundings, is disposed for substantially an entire period to be less than $\mu_s \times$g, $\mu_s$ being a static friction coefficient between the trough bottom and the material (7) and g being the gravitation constant, so that an acceleration between the trough bottom and the material is substantially 0 m/s$^2$, while the acceleration ($a_2$) of the trough bottom opposite to the conveying direction, relative to the material, is disposed to exceed $\mu_s \times$g, at least during some part of the movement opposite to the conveying direction.

8. The apparatus according to claim 7, wherein the acceleration ($a_2$) of the trough bottom opposite to the conveying direction, relative to the material, is disposed to exceed $\mu_s \times$g initially on a change in the direction of movement of the trough bottom, the material being set in motion relative to the trough bottom.

9. The apparatus according to claim 7, wherein the acceleration ($a_2$) of the trough bottom (5) opposite to the conveying direction, relative to the material (7), is disposed, after the material has been set in motion relative to the trough bottom to exceed $\mu_d \times g$, $\mu_d$ being a dynamic friction coefficient between the trough bottom and the material.

10. The apparatus according to claim 1, wherein the transportation of the material (7) on the trough bottom (5) is disposed to take place solely due to the movement of the trough bottom at different accelerations opposite to and in the conveying direction respectively, and owing to the fluidizing effect.

11. The apparatus according to claim 10, wherein the trough bottom (5) is, in addition to said movements at different acceleration opposite to and in the conveying direction, disposed to move with in principle symmetrical accelerations opposite to or in the conveying direction respectively, the trough bottom (5) being disposed to move at 45–180 cycles per minute, of which said movements at different acceleration represent 0.1–60 cycles per minute.

12. The apparatus according to claim 1, wherein said means (3) for creating an upwardly directed air or gas flow are disposed to pulse the air or gas flow at the frequency of 60–90 pulses per minute.

13. The apparatus according to claim 1, wherein said air or gas flow is disposed to refrigerate, freeze, dry, moisten or heat the material (7).

14. The apparatus according to claim 1, wherein the apparatus is disposed to combust the material (7) in conjunction with its transportation in an at least partly fluidized state.

15. The apparatus according to claim 1, wherein a second trough bottom (9) is arranged directly below said trough bottom (5), which second trough bottom (9) exhibits transverse openings (10) with homogeneous material lying in between, and which second trough bottom (9) is disposed to be agitated, preferably symmetrically, backwards and forwards along the conveying direction for the materials (7), at a frequency of 20–180 cycles per minute.

16. A method for treating and transporting a material (7), consisting of piece goods or granules of solid material, in an at least partly fluidized bed, the method comprising the steps of:
  moving a perforated trough bottom (5) with material (7) thereon from a starting position, in a conveying direction of the material (7) and also opposite to the conveying direction of the material (7), said step of moving including accelerating the trough bottom (5) in the direction opposite to the conveying direction at a greater acceleration ($a_2$) relative to the material (7) than a maximum acceleration ($a_1$) in the conveying direction; and
  creating an upwardly directed air or gas flow through said trough bottom (5) and said material (7).

17. The method according to claim 16, further comprising moving the trough bottom (5) an equally long distance in the conveying direction as opposite to the conveying direction, the through bottom not displaying any net movement in or opposite to the conveying direction.

18. The method according to claim 16, wherein the trough bottom (5) consists of at least one of a perforated plate and a perforated elongated track, wherein said track or plate is comprised of a homogeneous polymer material.

19. The method according to 16, further comprising moving an overflow edge (6) together with the trough bottom (5).

20. The method according to claim 19, further comprising dropping or lowering the overflow edge during movement in the direction opposite to the conveying direction.

21. The method according to claim 16, further comprising moving the trough bottom (5) so that it does not exhibit substantially any acceleration or speed relative to the material (7) conveyed during substantially an entire conveying movement period, and so that it does, in a movement direction opposite to the conveying direction, exhibit acceleration relative to the material conveyed for substantially the entire opposite conveying movement period.

22. The method according to claim 16, wherein the acceleration ($a_1$) of the trough bottom (5) in the conveying direction, relative to the surroundings, is disposed for substantially an entire period to be less than $\mu_s \times g$, $\mu_s$ being a static friction coefficient between the trough bottom and the material (7) and g being the gravitation constant, so that an acceleration between the trough bottom and the material is substantially 0 m/s$^2$, while the acceleration ($a_2$) of the trough bottom opposite to the conveying direction, relative to the material, is disposed to exceed $\mu_s \times g$, at least during some part of the movement opposite to the conveying direction.

23. The method according to claim 22, wherein the acceleration ($a_2$) of the trough bottom opposite to the conveying direction, relative to the material, is disposed to exceed $\mu_s \times g$ initially on a change in the direction of movement of the trough bottom, the material being set in motion relative to the trough bottom.

24. The method according to claim 22, wherein the acceleration ($a_2$) of the trough bottom (5) opposite to the conveying direction, relative to the material (7), is disposed, after the material has been set in motion relative to the trough bottom to exceed $\mu_d \times g$, $\mu_d$ being a dynamic friction coefficient between the trough bottom and the material.

25. The method according to claim 16, wherein the transportation of the material (7) on the trough bottom (5) is disposed to take place solely due to the movement of the trough bottom at different accelerations opposite to and in the conveying direction respectively, and owing to the fluidizing effect.

26. The method according to claim 25, wherein the trough bottom (5) is, in addition to said movements at different acceleration opposite to and in the conveying direction, moves with in principle symmetrical accelerations opposite to or in the conveying direction respectively, the trough bottom (5) being disposed to move at 45–180 cycles per minute, of which said movements at different acceleration represent 0.1–60 cycles per minute.

27. The method according to claim 16, further comprising pulsing the air or gas flow at the frequency of 60–90 pulses per minute.

28. The method according to claim 16, further comprising refrigerating, freezing, drying, moistening or heating the material (7).

29. The method according to claim 16, further comprising combusting the material (7) in conjunction with its transportation in an at least partly fluidized state.

30. The method according to claim 16, arranging a second trough bottom (9) directly below said trough bottom (5), which second trough bottom (9) exhibits transverse openings (10) with homogeneous material lying in between, and which second trough bottom (9) agitates, preferably symmetrically, backwards and forwards along the conveying direction for the materials (7), at a frequency of 20–180 cycles per minute.

* * * * *